(12) United States Patent
Guo

(10) Patent No.: US 9,449,153 B2
(45) Date of Patent: Sep. 20, 2016

(54) UNIQUE AND UNCLONABLE PLATFORM IDENTIFIERS USING DATA-DEPENDENT CIRCUIT PATH RESPONSES

(71) Applicant: QUALCOMM Incorporated, San Diego, CA (US)

(72) Inventor: Xu Guo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 465 days.

(21) Appl. No.: 13/752,215

(22) Filed: Jan. 28, 2013

(65) Prior Publication Data

US 2014/0181986 A1      Jun. 26, 2014

Related U.S. Application Data

(60) Provisional application No. 61/740,333, filed on Dec. 20, 2012.

(51) Int. Cl.
*G06F 21/10* (2013.01)
*G01R 31/30* (2006.01)
(Continued)

(52) U.S. Cl.
CPC ........... *G06F 21/10* (2013.01); *G01R 31/3004* (2013.01); *H04L 9/3278* (2013.01); *G01R 31/28* (2013.01); *G01R 31/31725* (2013.01); *G06F 21/12* (2013.01); *G06F 21/121* (2013.01);
(Continued)

(58) Field of Classification Search
CPC ........ G06F 21/10; G06F 21/12; G06F 21/00; G06F 21/121; G06F 21/70; G06F 21/76; G06F 21/73; G06F 21/86; G06F 21/71;
G11B 20/00086; G11B 20/00115; G01R 31/3004; G01R 31/31725; G01R 31/31937; G01R 31/28; H04L 9/3278
USPC .......................................................... 726/26
See application file for complete search history.

(56) References Cited

U.S. PATENT DOCUMENTS

2011/0002461 A1*  1/2011 Erhart et al. .................... 380/44
2011/0148457 A1   6/2011 Abramovici
(Continued)

FOREIGN PATENT DOCUMENTS

TW            I347537       8/2011
TW            M443215 U     12/2012
WO      WO-2011086051 A1    7/2011

OTHER PUBLICATIONS

Guo, et al., "ASIC Implementations of Five SHA-3 Finalists", 2012 EDAA, 6 pages.
(Continued)

*Primary Examiner* — Morshed Mehedi
*Assistant Examiner* — Ayoub Alata
(74) *Attorney, Agent, or Firm* — Won Tae C. Kim

(57) ABSTRACT

A method and apparatus are provided for generating a unique identifier. One or more tests are performed over one or more data-dependent circuit paths for one or more circuits. The one or more tests are then repeated over the one or more data-dependent circuit paths for the one or more circuits while adjusting an operating frequency and/or operating voltage for each of the one or more circuits. A threshold frequency and/or threshold voltage is ascertained for each of the one or more data-dependent circuit paths. An identifier may then be generated based on a plurality of the threshold frequencies and/or threshold voltages ascertained for the one or more data-dependent circuit paths.

36 Claims, 6 Drawing Sheets

(51) Int. Cl.
 *H04L 9/32* (2006.01)
 *G06F 21/70* (2013.01)
 *G06F 21/76* (2013.01)
 *G01R 31/28* (2006.01)
 *G06F 21/73* (2013.01)
 *G06F 21/86* (2013.01)
 *G06F 21/12* (2013.01)
 *G06F 21/71* (2013.01)
 *G01R 31/317* (2006.01)

(52) U.S. Cl.
 CPC .............. *G06F21/70* (2013.01); *G06F 21/71* (2013.01); *G06F 21/73* (2013.01); *G06F 21/76* (2013.01); *G06F 21/86* (2013.01)

(56) References Cited

U.S. PATENT DOCUMENTS

2011/0215829 A1    9/2011  Guajardo et al.
2011/0317829 A1*  12/2011  Ficke et al. ................. 380/46
2012/0044777 A1*   2/2012  Fujiwara et al. ........... 365/191

OTHER PUBLICATIONS

Handschuh, et al., "Hardware intrinsic security from physically unclonable functions", Towards Hardware-Intrinsic Security, Information Security and Cryptography, 2011, pp. 39-54.
Tuzzio, et al., "A Zero-Overhead IC Identification Technique Using Clock Sweeping and Path Delay Analysis," GLSVLSI '12, May 3-4, 2012, Salt Lake City, UT, pp. 95-98.
International Search Report and Written Opinion—PCT/US2013/077049—ISA/EPO—Apr. 16, 2014.
Suh G.E., et al., "Physical Unclonable Functions for Device Authentication and Secret Key Generation", 2007 44th ACM/IEEE Design Automation Conference : San Diego, CA, Jun. 4-8, 2007, IEEE, Piscataway, NJ, Jun. 1, 2007, pp. 9-14, XP031183294, ISBN: 978-1-59593-627-1, p. 10, right-hand column, paragraph 6-p. 11, left-hand column, paragraph 1; figure 2.
Yin C-E., et al., "Temperature-aware cooperative ring oscillator PUF", Hardware-Oriented Security and Trust, 2009. Host '09. IEEE International Workshop on, IEEE, Piscataway, NJ, USA, Jul. 27, 2009, pp. 36-42, XP031520802, DOI: 10.1109/HST.2009.5225055 ISBN: 978-1-4244-4805-0 the whole document.
Taiwan Search Report—TW102147568—TIPO—Aug. 20, 2015.

* cited by examiner

| Input Vector | Freq-A | Freq-B | Freq-C | Freq-D | Freq-E | Freq-F |
|---|---|---|---|---|---|---|
| test-a | Pass | Pass | Pass | Pass | Fail | Fail |
| test-b | Pass | Pass | Pass | Pass | Pass | Fail |
| test-c | Pass | Pass | Pass | Fail | Fail | Fail |
| test-d | Pass | Pass | Fail | Fail | Fail | |

*FIG. 3*

| Input Vector | Volt-A | Volt-B | Volt-C | Volt-D | Volt-E | Volt-F |
|---|---|---|---|---|---|---|
| test-a | Pass | Pass | Pass | Pass | Fail | Fail |
| test-b | Pass | Pass | Pass | Pass | Pass | Fail |
| test-c | Pass | Pass | Pass | Fail | Fail | Fail |
| test-d | Pass | Pass | Fail | Fail | Fail | |

*FIG. 4*

| Input Vector | Freq/Volt-A | Freq/Volt-B | Freq/Volt-C | Freq/Volt-D | Freq/Volt-E | Freq/Volt-F |
|---|---|---|---|---|---|---|
| test-a | Pass | Pass | Pass | Pass | Fail | Fail |
| test-b | Pass | Pass | Pass | Pass | Pass | Fail |
| test-c | Pass | Pass | Pass | Fail | Fail | Fail |
| test-d | Pass | Pass | Fail | Fail | Fail | |

*FIG. 5*

UNIQUE AND UNCLONABLE PLATFORM IDENTIFIERS USING DATA-DEPENDENT CIRCUIT PATH RESPONSES

CLAIM OF PRIORITY UNDER 35 U.S.C. §119

The present application claims priority to U.S. Provisional Application No. 61/740,333 entitled "Unique and Unclonable Platform Identifiers Using Data-Dependent Circuit Path Responses", filed Dec. 20, 2012, which is hereby expressly incorporated by reference herein.

FIELD

Various features relate to generating unique and unclonable identifiers, and more specifically, to an identifier that is based on the intrinsic characteristics of a physical circuit or component.

BACKGROUND

Software protection is a family of computer security techniques that are used to prevent the unauthorized copying of software. In other words, software must be able to determine whether the user is properly licensed to use it, and run only if this is the case.

Another problem related to software protection is how to identify whether the chip (e.g., semiconductor device) or platform, on which the software is running, is a counterfeit chip. Counterfeit chips have proliferated and are a risk to the electronics supply chain. The product fallout from counterfeit semiconductors can range from small problems like dropped calls to much larger issues. Consequently, identifying and restricting the usage of counterfeit chips in the electronics supply chain is vital.

One of the biggest challenges for software intellectual property and content protection is to make the protected software be able to identify the hardware platform on which it is running There is a need to design a zero-cost solution which does not need to add extra logic to the existing chip designs and could even be applied to the already manufactured chips.

Therefore, a solution is needed that allows software to uniquely identify a hardware platform in which it is running without the need for extra logic and/or identification specific circuit components.

SUMMARY

A method operational in a processing circuit is provided for generating a unique identifier. One or more tests may be performed over one or more data-dependent circuit paths for one or more circuits. In various examples, the one or more circuits may be: (a) general purpose computational components, (b) non-identifier specific computational components, and/or (c) non-storage and/or non-memory circuits. In other examples, the one or more circuits may include at least one of: (a) one or more internal computational components; (b) one or more external computational components; and/or (c) a combination of internal and external computational components.

The one or more tests may be repeated over the one or more data-dependent circuit paths for the one or more circuits while adjusting an operating frequency and/or operating voltage for each of the one or more circuits. The operating frequency and/or operating voltage are adjusted by at least one of: (a) increasing the operating frequency on each iteration of the test; (b) decreasing the operating voltage on each iteration of the test; and/or (c) adjusting a combination of the operating frequency and operating voltage on each iteration of the test.

A threshold frequency and/or threshold voltage may be ascertained for each of the one or more data-dependent circuit paths. In one example, the threshold frequency may be the frequency at which a test over a given data-dependent circuit path provides an incorrect response to the test. In another example, the threshold frequency may be the frequency at which an expected response to a test over a given data-dependent circuit path changes to an unexpected response.

An identifier may then be generated based on a plurality of the threshold frequencies and/or threshold voltages ascertained for the one or more data-dependent circuit paths. In one example, the identifier may be associated with a platform which includes the processing circuit. In another example, the method may further (a) associate a software application installation to the identifier; and/or (b) bind execution of the software application on the processing circuit to successful verification of the identifier. Successful verification of the identifier may compare an original instance of the identifier to a subsequent generated instance of the identifier to ascertain that they are the same. In some examples, the identifier may be based on: (a) two or more threshold frequencies and/or threshold voltages for two or more different circuit paths for one circuit, or (b) two or more threshold frequencies and/or threshold voltages for two or more different circuit paths for two or more different circuits. The identifier may be stored for subsequent verification. During a verification process, a previously stored identifier may be retrieved. The generated identifier may then be compared to the previously stored identifier to ascertain whether they are the same.

An apparatus comprising one or more circuits coupled to a processing circuit may be provided for generating a unique identifier. The processing circuit may be adapted to: (a) perform one or more tests over one or more data-dependent circuit paths of one or more circuits; (b) repeat the one or more tests over the one or more data-dependent circuit paths for the one or more circuits while adjusting an operating frequency and/or operating voltage for each of the one or more circuits; (c) ascertain a threshold frequency and/or threshold voltage for each of the one or more data-dependent circuit paths; and/or (d) generate an identifier based on a plurality of the threshold frequencies and/or threshold voltages ascertained for the one or more data-dependent circuit paths.

In one example, the identifier may be associated with a platform which includes the processing circuit. In another example, a software application installation may be associated to the identifier, and execution of the software application on the processing circuit is bound to successful verification of the identifier. Successful verification of the identifier may compare an original instance of the identifier to a subsequent generated instance of the identifier to ascertain that they are the same.

In various examples, the one or more circuits may be: (a) general purpose computational components, (b) non-identifier specific computational components, and/or non-storage and/or non-memory circuits.

The operating frequency and/or operating voltage may be adjusted by at least one of: (a) increasing the operating frequency on each iteration of the test; (b) decreasing the operating voltage on each iteration of the test; and/or (c)

adjusting a combination of the operating frequency and operating voltage on each iteration of the test.

The one or more circuits may include at least one of: (a) one or more internal computational components, (b) one or more external computational components; and/or (c) a combination of internal and external computational components.

The threshold frequency may be the frequency at which: (a) a test over a given data-dependent circuit path provides an incorrect response to the test, and/or (b) an expected response to a test over a given data-dependent circuit path changes to an unexpected response.

The identifier may be based on: (a) two or more threshold frequencies and/or threshold voltages for two or more different circuit paths for one circuit, and/or (b) two or more threshold frequencies and/or threshold voltages for two or more different circuit paths for two or more different circuits.

DRAWINGS

Various features, nature and advantages may become apparent from the detailed description set forth below when taken in conjunction with the drawings in which like reference characters identify correspondingly throughout.

FIG. 3 is a table illustrating exemplary results for a set of input vectors at different operating frequencies.

FIG. 4 is a table illustrating exemplary results for a set of input vectors at different operating voltages.

FIG. 5 illustrates a table showing exemplary results for a set of input vectors at different operating frequency-voltage pairs.

DETAILED DESCRIPTION

Figure 1:
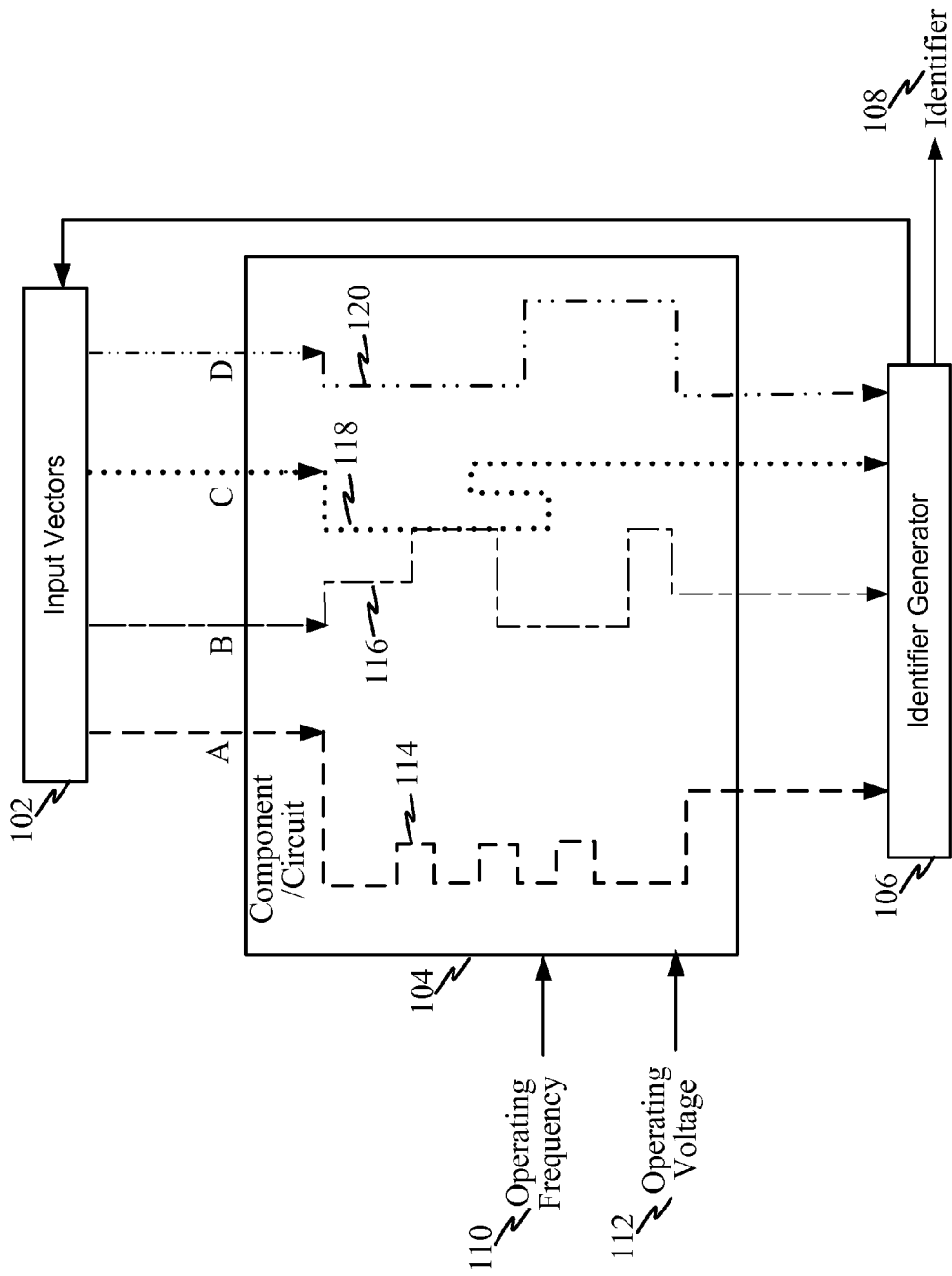
FIG. 1 illustrates a way of extracting an identifier (ID) by utilizing data-dependent circuit path response information for an on-board or off-board component or circuit.

In the following description, specific details are given to provide a thorough understanding of the various aspects of the disclosure. However, it will be understood by one of ordinary skill in the art that the aspects may be practiced without these specific details. For example, circuits may be shown in block diagrams in order to avoid obscuring the aspects in unnecessary detail. In other instances, well-known circuits, structures and techniques may not be shown in detail in order not to obscure the aspects of the disclosure.

The word "exemplary" is used herein to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation.

Overview

A first aspect provides for using the unique characteristics inherent in each semiconductor circuit to generate a unique and unclonable platform identifier which can be extracted by the software at runtime and can be used to judge whether the software is running on the expected or intended semiconductor circuit or whether it is instead running on a simulator environment or a counterfeit platform. Due to the variations in semiconductor manufacturing, the same circuit path in two instances of the same semiconductor circuit may have a different response (e.g., path delay, frequency response, voltage response, etc.). For example, the threshold frequency for stable operation for each data-dependent path of the same design (but in different semiconductor circuits) may vary. These variations among semiconductor circuits with the same design may be exploited/used to characterize each semiconductor circuit and generate a unique and unclonable identifier.

A second aspect provides for generating and applying different input vectors to simulate different data-dependent circuit paths and then extracting the frequency characteristics for each data-dependent circuit path. In one example, a set of instructions may use a given input to perform various operations (e.g., different mathematical operations, etc.). Depending on the input used, the operations performed may use different circuit paths (i.e., data-dependent paths). Thus, the input vectors may serve to introduce a plurality of data-dependent paths that can be characterized to generate the unique and unclonable platform identifier. By using a plurality of input vectors, each data-dependent circuit path tested repeatedly until the results for each circuit path become unstable (e.g., the test results change from previous tests or are incorrect). The last known stable voltage/frequency for each pre-defined test is used to generate the unique identifier.

A third aspect provides for characterizing data-dependent circuit paths among a plurality of different semiconductor circuits, and/or over multiple internal and/or external sub-circuits or components. The characterization of two or more data-dependent circuit paths in different semiconductor circuits, sub-circuits, and/or components is then used to generate the unique and unclonable identifier.

Exemplary Generation of Unique and Unclonable Identifier

A mechanism is provided for generating a unique and unclonable identifier for a hardware device based on intrinsic variations of physical components (e.g., semiconductor devices, electrical paths, electrical components, etc.) and the use of data-dependent circuit paths. For instance, when multiple semiconductor devices are manufactured, the complex semiconductor process introduces slight variations that are beyond the control of the manufacturer or designer. Even if two semiconductor devices are manufactured from the same silicon wafer, electrical wires/paths designed to be the same will probably differ in width by a few nanometers. Microscopic differences in the surface of the silicon may also induce almost trivial variations in the curvature of electrical paths. Additionally, soldering of the semiconductor devices on a printed circuit board may cause differences in capacitances/impedance, etc. As these unique characteristics are uncontrollable and inherent to a physical component (e.g., semiconductor device), quantifying them can produce an intrinsic, unique and unclonable identifier. Additionally, one or more data-dependent circuit paths (e.g., through one or more semiconductor devices) are used to further improve the uniqueness of the identifier.

The present approach may provide a zero-cost solution which does not need to add extra logic (e.g., circuit components, transistors, etc.) to a semiconductor design and may even be applicable to the already manufactured semiconductor devices.

FIG. 1 illustrates a way of extracting an identifier (ID) by utilizing data-dependent circuit path response information for an on-board or off-board component or circuit. In this example, the component or circuit 104 is being tested by an identifier generating module comprising input vectors 102 and an identifier generator 106. According to a few examples, the component or circuit may include: (a) a printed circuit board with electrically passive and active components, (b) a semiconductor device, and/or (c) a processing device. The component or circuit 104 may be dynamically configurable by adjusting its operating frequency 118 and/or its operating voltage 120.

As illustrated here, the component or circuit 104 may include multiple data-dependent circuit-paths A 114, B 116, C 118, and D 120. For example, the component or circuit 104 may be a signal processor, an arithmetic module, etc., that performs operations differently depending on the input data provided. For instance, additions and multiplication operations may take different paths in an arithmetic module. Additionally, an addition operation of larger numbers may take a different path than an addition operation of smaller numbers. Such "path" may refer to, for example, the transistor(s) and/or electrical traces through with a particular operation is performed in the component or circuit 104.

The input vectors 102 may include one or more instructions and/or data input that cause certain operations and/or computations to be performed by the component or circuit 104. Various examples of an input vector may include performing the operations: D1+D2, D1×D2, D1/D2, log (D1), bitwise D1 AND D2, D1 XOR D2, among other more complex operations on D1 and/or D2, where D1 and D2 are data inputs (e.g., numbers, bit strings, etc.). The input vectors may be any control signals or configurations that make a component run in different modes of operations.

A single input vector may be performed several times as an operating frequency 110 and/or voltage 112 for the component or circuit 104 is adjusted (e.g., increase frequency or decrease voltage, etc.) in each iteration. After each iteration, a check is performed to make sure the component/circuit 104 is still stable (e.g., providing the expected or correct response/result to the input vector). This process is repeated until a threshold operating frequency (or threshold operating voltage) is identified at which a data-dependent circuit path response/result changes. Once a threshold frequency and/or threshold voltage are identified, execution of that particular input vector on the data-dependent circuit path is ceased or terminated. Such threshold frequency for that particular input vector may then be used (e.g., in combination with the threshold frequencies for one or more other input vectors) to generate an identifier for the component or circuit.

The threshold frequency and/or threshold voltage may be ascertained in a number of ways. In a first example, the operating frequency 110 is incrementally increased while the operating voltage 112 is kept fixed. The threshold voltage and/or threshold frequency are those at which the response/result to the input vector changes or is incorrect.

In a second example, the operating voltage 112 is incrementally decreased, causing a corresponding decrease of the operating frequency 110. For instance, the operating voltage 112 may be incrementally reduced (decreased) each iteration of an input vector until the results/response changes. Note that as the operating voltage 112 is reduced, this may also reduce the operating frequency. The last minimum voltage (or resulting operating frequency) which provides the correct result/response for a particular input vector is used (e.g., in combination with the minimum voltage for one or more other input vectors) to generate an identifier for the component or circuit.

In a third example, the operating voltage 112 is incrementally decreased, while the operating frequency 110 is incrementally increased. For instance, a combination of both frequency and voltage may be adjusted (e.g., according to a predefined frequency/voltage pairing) until a threshold frequency/voltage is identified (e.g., frequency/voltage pair at which a particular data path becomes unstable).

The identifier generator 106 may keep track of the maximum stable operating frequency (or lowest stable operating voltage) for each test vector and then uses these to compute the unique and unclonable identifier for the component, circuit, or semiconductor.

In one example, the maximum operating frequency of a component, circuit, or semiconductor may be determined by the longest (critical) circuit path delay (e.g., a series of different gates or logic devices connected in a chain with a maximum latency). This also means that the component, circuit, or semiconductor has shorter paths with different path delays which are dependent on the data values it computes in a particular test vector. Due to the influence of semiconductor process variations to the circuit path delay, the maximum frequency/minimum voltage of each data-dependent critical path of the same design but in different components, circuits, or semiconductors will have random variations. This also implies that the characterization of these maximum frequency (or lowest voltage) information of each data-dependent circuit path is good source of identification information for a particular component, circuit, and/or semiconductor.

In some implementations, the data-dependent circuit paths may be dynamic circuit paths that receive an input and provide an output. So, they are non-storage and/or non-memory circuit paths.

Figure 2:
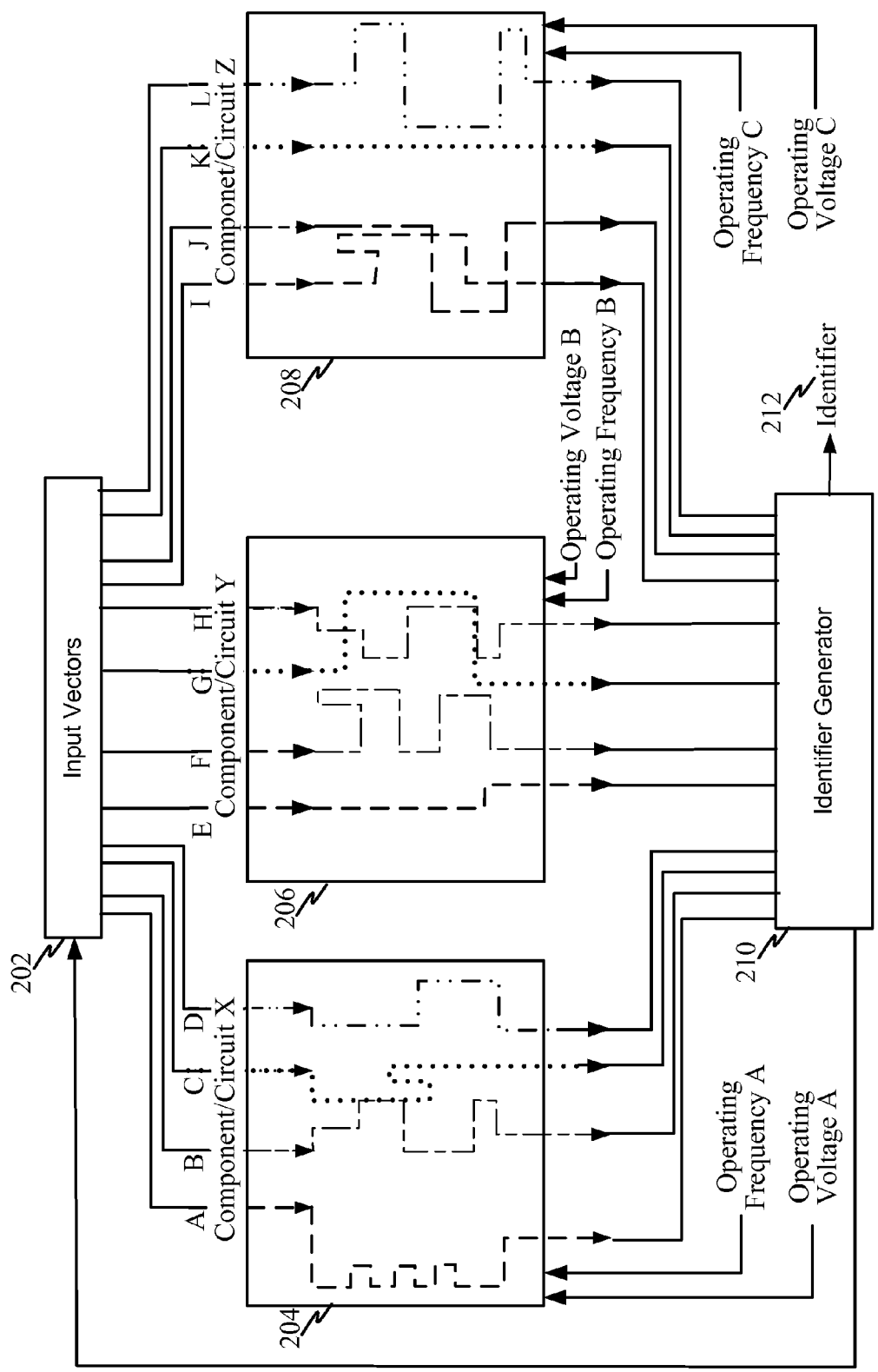
FIG. 2 illustrates a way of extracting a platform identification (ID) by utilizing data-dependent circuit path response information from multiple on-board or off-board components or circuits.

FIG. 2 illustrates a way of extracting a platform identification (ID) by utilizing data-dependent circuit path response information from multiple on-board or off-board components or circuits. This aspect operates similar to the approach describe in FIG. 1 but with a plurality components or circuits 204, 206, and 208 being used to run one or more input vectors 202. For each component or circuit 204, 206, and 208, an input vector may be run while iteratively adjusting the corresponding operating voltage and/or operating frequency for each component or circuit 204, 206, and 208.

In one implementation, the operating frequency of a first component or circuit 204 may be increased to ascertain the maximum stable frequency for one or more data-dependent paths in the first component or circuit 204. Meanwhile, the operating voltage of a second component or circuit 206 may be decreased to ascertain the minimum stable voltage for one or more data-dependent paths in the second component or circuit 206. Similarly, the operating frequency/voltage pair of a third component or circuit 208 may be adjusted to ascertain a threshold stable frequency/voltage pair for one or more data-dependent paths in the third component or circuit 208. The identifier generator may then use this response information for the plurality of components or circuits 204, 206, and 208 to compute a unique and unclonable intrinsic identifier for the platform (e.g., combination of components or circuits).

FIG. 3 is a table illustrating exemplary results for a set of input vectors at different operating frequencies. These input vectors may have been performed on one or more components, circuits, and/or semiconductor devices. Each of the input vectors (e.g., test-a, test-b, test-c, test-d) may be iteratively executed as the operating frequency is incrementally adjusted (e.g., increased) across one or more frequencies Freq-A, Freq-B, Freq-C, Freq-D, Freq-E, and/or Freq-F. As can be appreciated, depending on the data-dependent circuit path for each input vector, the input vector may Pass or Fail up to a maximum/threshold operating frequency. A Pass means that the data-dependent circuit path provided the expected or correct response to the input vector at a particular operating frequency. A Fail means that the data-dependent circuit path provided an incorrect, unexpected, or changed response to the input vector at a particular operating frequency. For example, in test-c, the transition from Pass to Fail occurs between Freq-C and Freq-D. Thus, the threshold frequency may be selected as either Freq-C or Freq-D. This threshold frequency at which an input vector transitions from Pass to Fail may be recorded and used to generate a unique and unclonable identifier associated with a platform.

FIG. 4 is a table illustrating exemplary results for a set of input vectors at different operating voltages. These input vectors may have been performed on one or more components, circuits, and/or semiconductor devices. Each of the input vectors (e.g., test-a, test-b, test-c, test-d) may be iteratively executed as the operating voltage is incrementally adjusted (e.g., decreased) across one or more voltages Volt-A, Volt-B, Volt-C, Volt-D, Volt-E, and/or Volt-F. As can be appreciated, depending on the data-dependent circuit path for each input vector, the input vector may Pass or Fail down to a minimum/threshold operating voltage. A Pass means that the data-dependent circuit path provided the expected or correct response to the input vector at a particular operating voltage. A Fail means that the data-dependent circuit path provided an incorrect, unexpected, or changed response to the input vector at a particular operating voltage. For example, in test-a, the transition from Pass to Fail occurs between Volt-D and Volt-E. Thus, the threshold voltage may be selected as either Volt-D or Volt-E. This threshold voltage at which an input vector transitions from Pass to Fail may be recorded and used to generate a unique and unclonable identifier associated with a platform.

FIG. 5 illustrates a table showing exemplary results for a set of input vectors at different operating frequency-voltage pairs. These input vectors may have been performed on one or more components, circuits, and/or semiconductor devices. Each of the input vectors (e.g., test-a, test-b, test-c, test-d) may be iteratively executed as the operating frequency/voltage pair is incrementally adjusted (e.g., increased or decreased) across one or more frequency/voltage pairs Freq/Volt-A, Freq/Volt-B, Freq/Volt-C, Freq/Volt-D, Freq/Volt-E, and/or Freq/Volt-F. As can be appreciated, depending on the data-dependent circuit path for each input vector, the input vector may Pass or Fail up to a threshold operating frequency-voltage pair. A Pass means that the data-dependent circuit path provided the expected or correct response to the input vector at a particular operating frequency/voltage pair. A Fail means that the data-dependent circuit path provided an incorrect, unexpected, or changed response to the input vector at a particular operating frequency/voltage pair. For example, in test-d, the transition from Pass to Fail occurs between Freq/Volt-B and Freq/Volt-C. Thus, the threshold frequency/voltage pair may be selected as either Volt-B or Volt-C. This threshold frequency/voltage pair at which an input vector transitions from Pass to Fail may be recorded and used to generate a unique and unclonable identifier associated with a platform.

Figure 6:
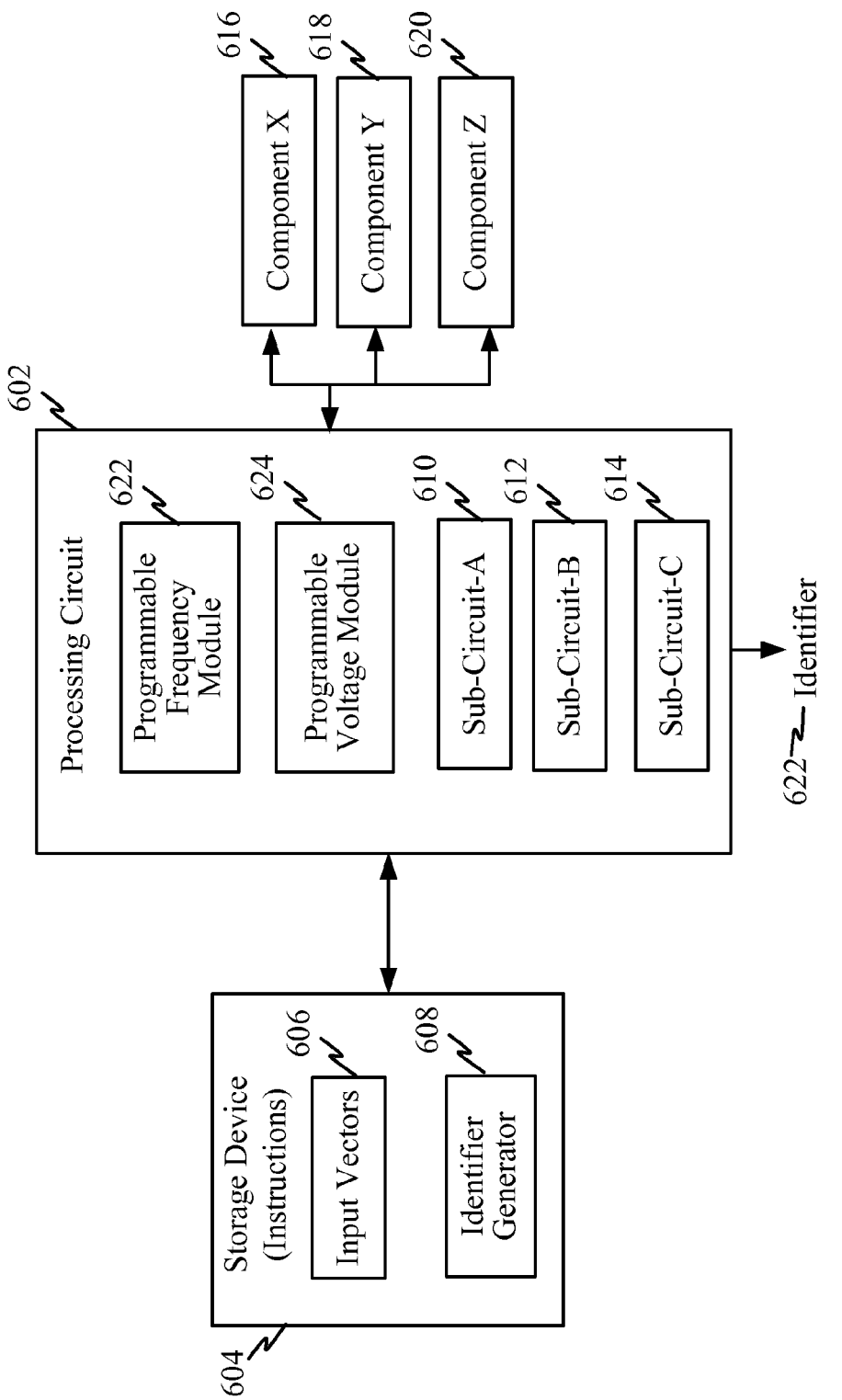
FIG. 6 illustrates an exemplary processing circuit which may be adapted to compute a unique and unclonable identifier based on data-dependent circuit paths.

FIG. 6 illustrates an exemplary processing circuit which may be adapted to compute a unique and unclonable identifier based on data-dependent circuit paths. In one example, the processing circuit 602 may be coupled to an external storage device 604 containing instructions to effectuate generation of a unique identifier based on characteristics for one or more data-dependent circuit paths. In another example, the storage device 604 may be integrated with the processing circuit 602 to effectuate generation of the unique identifier based on characteristics for one or more data-dependent circuit paths. The processing circuit 602 may also include a programmable frequency module 622 (e.g., clock generator, etc.) that permits adjusting an operating frequency for one or more internal sub-circuits 610, 612, and/or 614 and/or one or more external components 616, 618, and 620. Additionally, the processing circuit 602 may also include a programmable voltage module 624 that permits adjusting an operating voltage for the one or more internal sub-circuits 610, 612, and/or 614 and/or the one or more external components 616, 618, and 620.

The processing circuit 602 may include or obtain one or more instructions from the storage device 604 to ascertain data-dependent path response information for the one or more internal sub-circuits 610, 612, and/or 614 and/or the one or more external components 616, 618, and 620. One or more input vectors 606 may be used by the processing circuit to execute or perform one or more operations on the sub-circuits 610, 612, 614, and/or components 616, 618, 620. These input vectors may be run multiple times while incrementally adjusting the operating frequency and/or operating voltage of each of the sub-circuits 610, 612, 614 or components 616, 618, and 620 being tested until a threshold frequency and/or threshold voltage is ascertained for each data-dependent circuit path. An identifier generator 608 then uses the resulting threshold frequencies and/or threshold voltages for a plurality of the data-dependent paths tested to generate a unique identifier 622.

In one example, the unique identifier is associated with a platform which includes the processing circuit 602, the internal/external circuits 610, 612, 614 and/or the components 616, 618, and 620.

In another example, the unique identifier is associated with a software application installation or execution on the processing circuit.

In yet another example, execution of a software application on the processing circuit 602 may be bound to successful verification of the unique identifier. For instance, every time the software application is executed, a verification is performed to ascertain that it is still being executed on the same platform as when it was installed based on the unique identifier. Successful verification of the unique identifier may compare an original instance of the unique identifier to a subsequent generated instance of the unique identifier to ascertain that they are the same.

Figure 7:
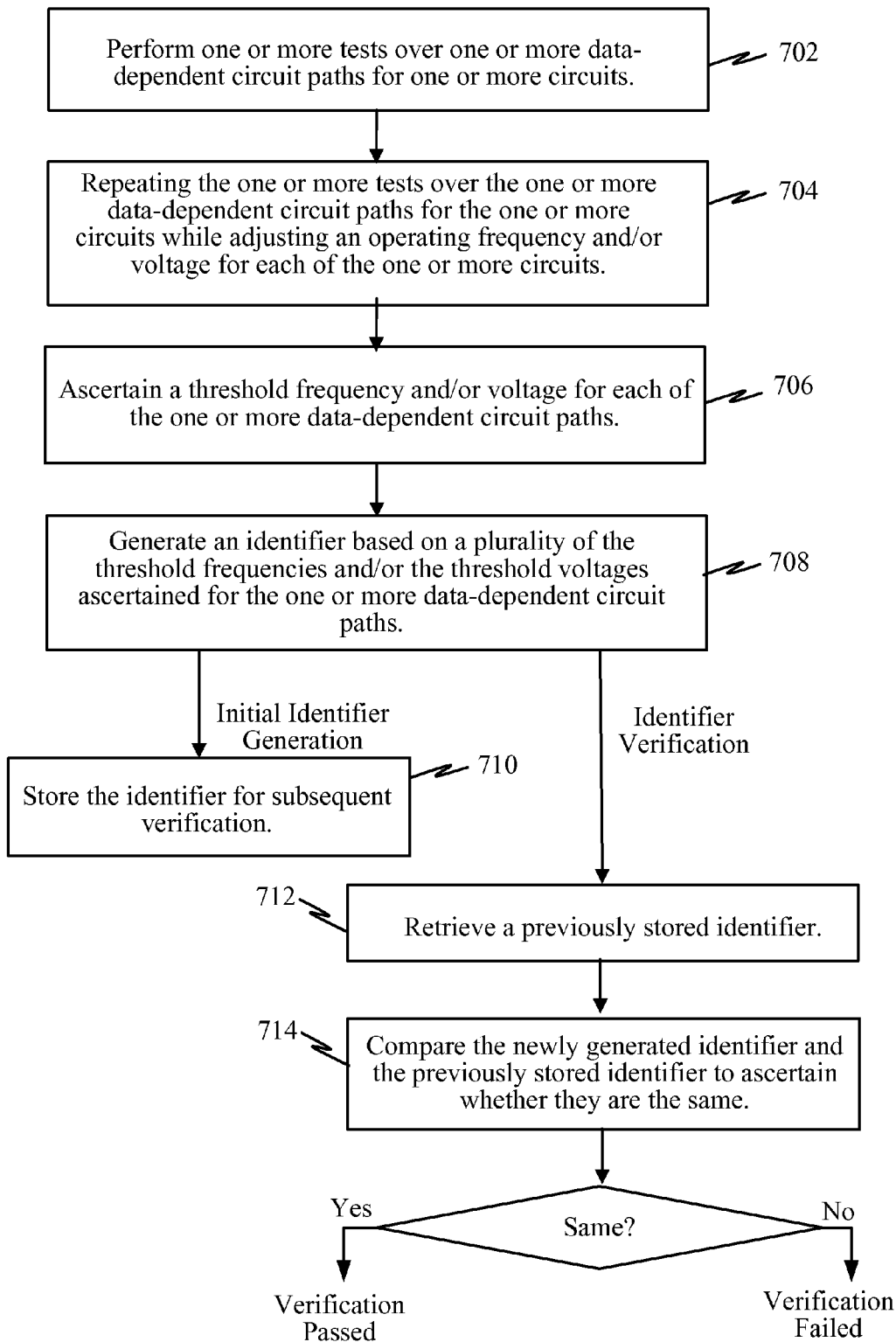
FIG. 7 illustrates a method for computing a unique and unclonable platform identifier (ID) by utilizing data-dependent circuit path response information for one or more on-board and/or off-board components, circuits, and/or semiconductors.

FIG. 7 illustrates a method for computing a unique and unclonable platform identifier (ID) by utilizing data-dependent circuit path response information for one or more on-board and/or off-board components, circuits, and/or semiconductors. One or more tests (e.g., input vectors, computational operations, etc.) may be performed on one or more data-dependent circuit paths for one or more circuits 702. Note that the one or more circuits may not be identifier-specific circuits, but rather general purpose circuits. In some instances, the one or more circuits are non-storage and/or non-memory circuits.

The one or more tests may be repeated over the one or more data-dependent circuit paths for the one or more circuits while adjusting an operating frequency and/or voltage for each of the one or more circuits 704. For instance, the operating frequency for each of the one or more circuits may be increased and/or the operating voltage for the one or more circuits may be decreased. A threshold frequency and/or voltage may be ascertained for each of the one or more data-dependent circuit paths 706. For example, such threshold frequency or voltage may be the maximum frequency or minimum voltage at which a particular test starts to fail (e.g., the result/response changes).

An identifier may then be generated based on a plurality of the threshold frequencies and/or voltages ascertained for the one or more data-dependent circuit paths 708. In one example, the identifier may be based (e.g., generated) on two or more threshold frequencies and/or threshold voltages for two or more different circuit paths for one circuit. In another example, the identifier may be based on two or more threshold frequencies and/or threshold voltages for two or more different circuit paths for two or more different circuits.

In the case where the identifier is being initially generated, it may be stored (e.g., in non-volatile memory) for subsequent verification 710. For instance, a software application may obtain and store a first identifier when it is installed on a platform, thereby binding the software installation to one or more specific circuits, microprocessors, and/or semiconductor devices for a platform.

In the case where an identifier is being verified, a previously stored identifier is retrieved 712. The newly generated identifier (from step 708) is then compared to the previously stored identifier to ascertain whether they are the same 714. If they are the same, then it may be concluded that the platform used to generate both the stored identifier and newly generated identifier is the same and verification is successful. Otherwise, if the newly generated identifier and stored identifier are different, verification fails. For instance, on subsequent start-ups of a software application, it may verify that it is still being executed on its original platform by verifying a newly generated identifier to a previously stored identifier, thereby binding the software installation to one or more specific circuits, microprocessors, and/or semiconductor devices for the platform.

Two exemplary implementation scenarios may be defined on a system-on-chip platform. In a first example, a processor with platform identifier extraction control software, a programmable clock generator, and an on-chip computational component coupled to an on-chip bus in communication with the processor. The on-chip computational component may provide one or more data-dependent circuit paths that can be used by the identifier extraction control software to generate an identifier. In a second example, a processor with platform identifier extraction control software, a programmable clock generator, and an off-chip computational component in communication with the processor. Here, the off-chip computational component may provide one or more data-dependent circuit paths that can be used by the identifier extraction control software to generate an identifier.

In both exemplary implementation scenarios, the processor may operate at a designated frequency in a stable state and it will execute several steps. First, the control software may be run/executed with a collection of the test (input) vectors which can address different data-dependent circuit paths to test the on/off-chip computational components at first operating frequency. Second, the control software may then be run/executed with the test (while) vectors while at the same time the clock frequency generator is adjusted to increase or decrease the clock frequency (e.g., operating frequency) supplied to the computational component under test until a threshold frequency (e.g., maximum frequency) for each data-dependent circuit path is ascertained and/or recorded. A comparison and quantization procedure may then be used to generate the unique identifier, which may also be a platform identifier. If the platform has multiple on-chip and/or off-chip computational components, multiple extracted identifiers can be combined into a single platform identifier.

This approach may be applicable to existing processors, semiconductors, and/or chips, many of which already have flexible clock frequency control mechanism enabled for low power consumption. Additionally, this approach for generating a unique identifier is bound to the hardware does not need to use external expensive testing setups and procedures. Moreover, there is no need to revise current chip design by adding extra hardware logic and its function can be enabled by software requests, so it is a zero-cost solution.

One or more of the components, steps, features, and/or functions illustrated in the Figures may be rearranged and/or combined into a single component, step, feature or function or embodied in several components, steps, or functions. Additional elements, components, steps, and/or functions may also be added without departing from the invention. The apparatus, devices, and/or components illustrated in the Figures may be configured to perform one or more of the methods, features, or steps described in the Figures. The algorithms described herein may also be efficiently implemented in software and/or embedded in hardware.

Moreover, in one aspect of the disclosure, the processing circuit(s) illustrated in the Figures may be a specialized processor (e.g., an application specific integrated circuit (e.g., ASIC)) that is specifically designed and/or hard-wired to perform the algorithms, methods, and/or steps described in the Figures. Thus, such a specialized processor (e.g., ASIC) may be one example of a means for executing the algorithms, methods, and/or steps described in the Figures. The computer-readable storage medium may also store processor readable instructions that when executed by a specialized processor (e.g., ASIC) causes the specialized processor to perform the algorithms, methods, and/or steps described in the Figures.

Also, it is noted that the aspects of the present disclosure may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing, containing or carrying instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, aspects of the disclosure may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method operational in a processing circuit for generating a unique identifier, comprising:
    performing one or more tests over one or more data-dependent circuit paths for one or more circuits;
    repeating the one or more tests over the one or more data-dependent circuit paths for the one or more circuits while adjusting an operating frequency and/or operating voltage for each of the one or more circuits to produce a plurality of test results;
    ascertaining a threshold frequency and/or threshold voltage for each of the one or more data-dependent circuit paths using at least one of the plurality of test results; and
    generating an identifier based on a plurality of threshold frequencies and/or threshold voltages ascertained for the one or more data-dependent circuit paths.

2. The method of claim 1, wherein the identifier is associated with a platform which includes the processing circuit.

3. The method of claim 1, further comprising:
    associating a software application installation to the identifier; and
    binding execution of the software application on the processing circuit to successful verification of the identifier.

4. The method of claim 3, wherein successful verification of the identifier compares an original instance of the identifier to a subsequent generated instance of the identifier to ascertain that they are the same.

5. The method of claim 1, wherein the one or more data-dependent circuit paths are determined as a function of the one or more tests such that a first test causes a first operation to be performed by the processing circuit through a first data-dependent circuit path and a second test causes a second operation different than the first operation to be performed by the processing circuit through a second data-dependent circuit path.

6. The method of claim 1, wherein the one or more circuits are general purpose computational components and/or non-identifier specific computational components.

7. The method of claim 1, wherein the one or more circuits are non-storage and/or non-memory circuits.

8. The method of claim 1, wherein the operating frequency and/or operating voltage are adjusted by at least one of:
    increasing the operating frequency on each iteration of the one or more tests;
    decreasing the operating voltage on each iteration of the one or more tests; and/or
    adjusting a combination of the operating frequency and operating voltage on each iteration of the one or more tests.

9. The method of claim 1, wherein the one or more circuits include at least one of:
    one or more internal computational components;
    one or more external computational components; and/or a combination of internal and external computational components.

10. The method of claim 1, wherein the threshold frequency is the frequency at which a test over a given data-dependent circuit path provides an incorrect response to the test.

11. The method of claim 1, wherein the threshold frequency is the frequency at which an expected response to a test over a given data-dependent circuit path changes to an unexpected response.

12. The method of claim 1, wherein the identifier is based on:
two or more threshold frequencies and/or threshold voltages for two or more different circuit paths for one circuit.

13. The method of claim 1, wherein the identifier is based on:
two or more threshold frequencies and/or threshold voltages for two or more different circuit paths for two or more different circuits.

14. The method of claim 1, further comprising:
storing the identifier for subsequent verification.

15. The method of claim 1, further comprising:
retrieving a previously stored identifier; and
comparing the generated identifier to the previously stored identifier to ascertain whether they are the same.

16. An apparatus, comprising:
one or more circuits;
a processing circuit coupled to the one or more circuits, the processing circuit adapted to:
perform one or more tests over one or more data-dependent circuit paths of one or more circuits;
repeat the one or more tests over the one or more data-dependent circuit paths for the one or more circuits while adjusting an operating frequency and/or operating voltage for each of the one or more circuits to produce a plurality of test results;
ascertain a threshold frequency and/or threshold voltage for each of the one or more data-dependent circuit paths using at least one of the plurality of test results; and
generate an identifier based on a plurality of threshold frequencies and/or threshold voltages ascertained for the one or more data-dependent circuit paths.

17. The apparatus of claim 16, wherein the identifier is associated with a platform which includes the processing circuit.

18. The apparatus of claim 16, wherein the processing circuit is further adapted to:
associate a software application installation to the identifier; and
bind execution of the software application on the processing circuit to successful verification of the identifier.

19. The apparatus of claim 18, wherein successful verification of the identifier compares an original instance of the identifier to a subsequent generated instance of the identifier to ascertain that they are the same.

20. The apparatus of claim 16, wherein the one or more data-dependent circuit paths are determined as a function of the one or more tests such that a first test causes a first operation to be performed by the processing circuit through a first data-dependent circuit path and a second test causes a second operation different than the first operation to be performed by the processing circuit through a second data-dependent circuit path.

21. The apparatus of claim 16, wherein the one or more circuits are general purpose computational components and/or non-identifier specific computational components.

22. The apparatus of claim 16, wherein the one or more circuits are non-storage and/or non-memory circuits.

23. The apparatus of claim 16, wherein the operating frequency and/or operating voltage are adjusted by at least one of:
increasing the operating frequency on each iteration of the one or more tests;
decreasing the operating voltage on each iteration of the one or more tests; and/or
adjusting a combination of the operating frequency and operating voltage on each iteration of the one or more tests.

24. The apparatus of claim 16, wherein the one or more circuits include at least one of:
one or more internal computational components;
one or more external computational components; and/or
a combination of internal and external computational components.

25. The apparatus of claim 16, wherein the threshold frequency is the frequency at which a test over a given data-dependent circuit path provides an incorrect response to the test.

26. The apparatus of claim 16, wherein the threshold frequency is the frequency at which an expected response to a test over a given data-dependent circuit path changes to an unexpected response.

27. The apparatus of claim 16, wherein the identifier is based on:
two or more threshold frequencies and/or threshold voltages for two or more different circuit paths for one circuit.

28. The apparatus of claim 16, wherein the identifier is based on:
two or more threshold frequencies and/or threshold voltages for two or more different circuit paths for two or more different circuits.

29. An apparatus, comprising:
means for performing one or more tests over one or more data-dependent circuit paths for one or more circuits;
means for repeating the one or more tests over the one or more data-dependent circuit paths for the one or more circuits while adjusting an operating frequency and/or operating voltage for each of the one or more circuits to produce a plurality of test results;
means for ascertaining a threshold frequency and/or threshold voltage for each of the one or more data-dependent circuit paths using at least one of the plurality of test results; and
means for generating an identifier based on a plurality of threshold frequencies and/or threshold voltages ascertained for the one or more data-dependent circuit paths.

30. The apparatus of claim 29, wherein the operating frequency and/or voltage are adjusted by at least one of:
increasing the operating frequency on each iteration of the one or more tests;
decreasing the operating voltage on each iteration of the one or more tests; and/or
adjusting a combination of the operating frequency and operating voltage on each iteration of the one or more tests.

31. The apparatus of claim 29, wherein the one or more circuits include one of:
one or more internal computational components;
one or more external computational components; or a combination of internal and external computational components.

32. The apparatus of claim 29, wherein the threshold frequency and/or threshold voltage is the frequency and/or voltage, respectively, at which an expected response to a test over a given data-dependent circuit path changes to an unexpected response.

33. The apparatus of claim 29, wherein the identifier is based on:
two or more threshold frequencies and/or voltages for two or more different circuit paths for at least one circuit.

34. A non-transitory machine-readable storage medium having instructions stored thereon, which when executed by at least one processor causes the at least one processor to:
perform one or more tests over one or more data-dependent circuit paths for one or more circuits;
repeat the one or more tests over the one or more data-dependent circuit paths for the one or more circuits while adjusting an operating frequency and/or operating voltage for each of the one or more circuits to produce a plurality of test results;
ascertain a threshold frequency and/or threshold voltage for each of the one or more data-dependent circuit paths using at least one of the plurality of test results; and
generate an identifier based on a plurality of threshold frequencies and/or threshold voltages ascertained for the one or more data-dependent circuit paths.

35. The non-transitory machine-readable storage medium of claim 34, wherein the operating frequency and/or voltage are adjusted by at least one of:
increasing the operating frequency on each iteration of the one or more tests;
decreasing the operating voltage on each iteration of the one or more tests; and/or
adjusting a combination of the operating frequency and operating voltage on each iteration of the one or more tests.

36. The non-transitory machine-readable storage medium of claim 34, wherein the one or more circuits include one of:
one or more internal computational components;
one or more external computational components; or
a combination of internal and external computational components.

* * * * *